Oct. 23, 1962
P. C. MUNT
3,059,991
METHOD OF MAKING ORIENTED FILAMENTARY ARTICLE
OF ISOTACTIC POLYPROPYLENE
Filed March 20, 1959
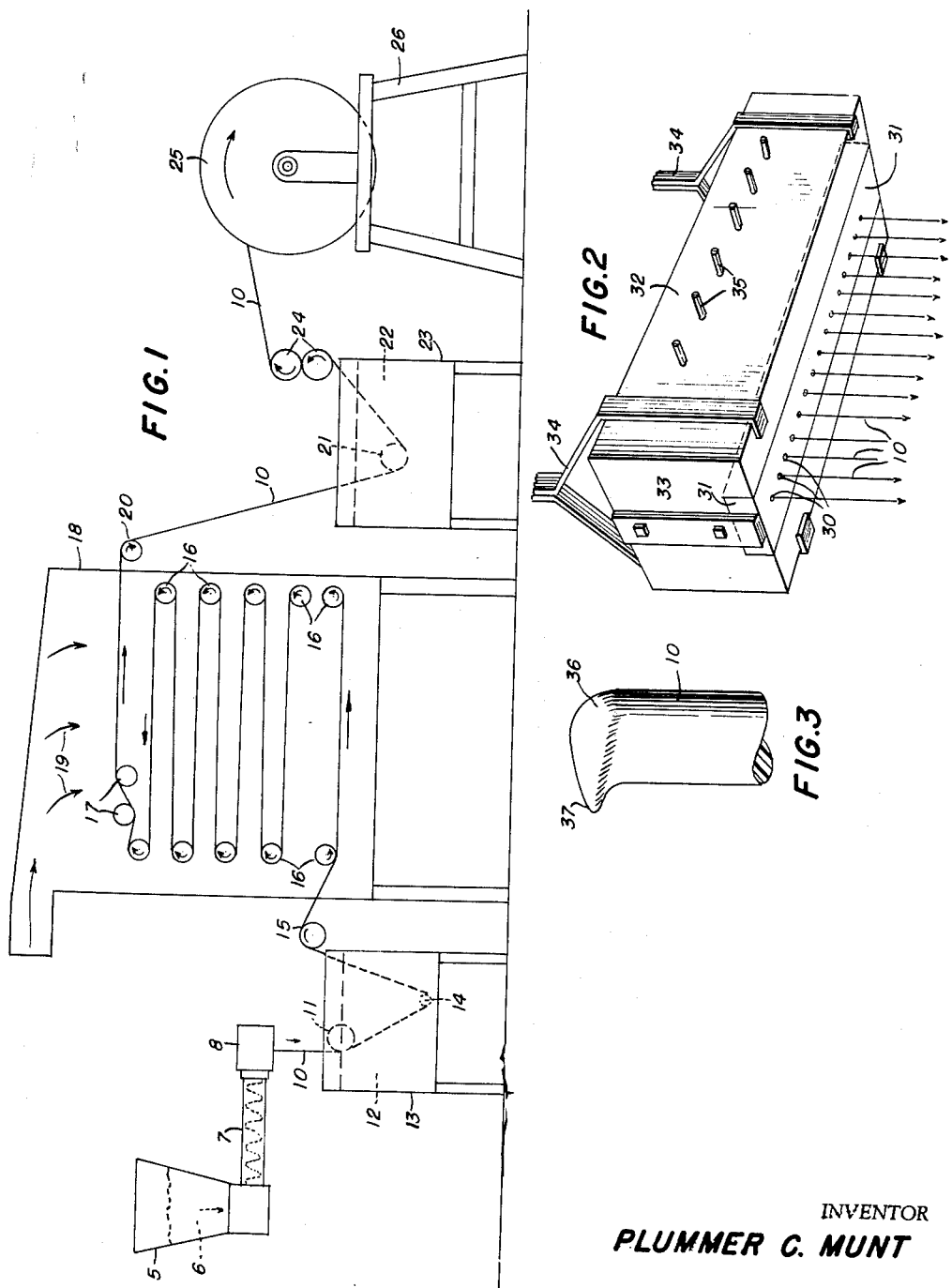
INVENTOR
PLUMMER C. MUNT
BY *Beale and Jones*
ATTORNEYS

United States Patent Office 3,059,991
Patented Oct. 23, 1962

3,059,991
METHOD OF MAKING ORIENTED FILAMENTARY ARTICLE OF ISOTACTIC POLYPROPYLENE
Plummer C. Munt, Burlington, Vt., assignor to E. B. & A. C. Whiting Company
Filed Mar. 20, 1959, Ser. No. 800,840
7 Claims. (Cl. 18—54)

This invention relates to oriented filaments, fibers, bristles and other shaped articles of isotactic polypropylene and to a method of making the same.

Melt extruded, stretch oriented fibers of isotactic polypropylene have been reported, for instance, in an article by V. Erlich appearing in Modern Textiles Magazine, November 1958, pages 59–66. Such fibers have high tensile strength and other desirable properties. However, the fibers or filaments of oriented isotactic polypropylene produced heretofore had a marked tendency to curl and are, therefore, unsuitable in many applications especially as synthetic bristles. Other objections to the prior art fibers are lack of stiffness, air bubbles entrained within the fibers and nubs or irregularity of cross-section along the length of the fibers.

It has been discovered that straight, non-curling, highly stiff and uniform oriented filaments may be manufactured from crystalline isotactic polypropylene having a high molecular weight as indicated by a melt index of from 28 grams/ten minutes to 30 grams/ten minutes under a load of 10 kilograms at 250° C., which melt index is determined in accordance with ASTM D1238–52T employing the load and temperature specified. In order to obtain these desirable filaments, a process comprising certain specific steps also must be followed. In outline, the steps of the process are melt extruding filaments of the polypropylene, quenching the freshly extruded filaments in a liquid non-solvent bath for the filaments maintained at a temperature of from about 40° F. to about 60° F., gradually heating the quenched filaments to their softening temperature, i.e. from about 260° F. to about 305° F., stretching the heat softened filaments from about six to about eleven times their length, and quenching the filaments a second time after stretching in a liquid non-solvent bath for the filaments maintained at a temperature of at least as low as about 60° F.

It is therefore the principal object of this invention to provide a method for the manufacture of straight, non-curling, oriented filaments of crystalline isotactic polypropylene. Another object of the invention is oriented filaments of the same material having novel stiffness characteristics. Still another object is a novel synthetic bristle of polypropylene. Other objects and advantages of the invention are apparent from the complete description thereof which follows.

The aspects of this invention that are capable of illustration are shown in the accompanying drawings.

FIGURE 1 is a schematic view of a suitable overall arrangement of apparatus for carrying out the method of this invention.

FIGURE 2 is an enlarged view of the extrusion head in FIGURE 1.

FIGURE 3 is a magnification of the cut end of a bristle made in accordance with this invention.

The drawings are further explained in detail as follows.

In FIGURE 1, a hopper 5 contains the starting material 6, pelletized crystalline isotactic polypropylene. The polypropylene pellets 6 are pre-heated in the hopper 5 to about 180° F. From the hopper 5, the polypropylene 6 is conveyed by a heated screw mechanism 7 or through any conventional thermoplastic extruder, to a heated extrusion head 8. Thus, the temperature of the polypropylene is raised above its melting point as it is conveyed to the extrusion head 8 and extruded through orifices 30 shown in FIGURE 2, as one or more filaments 10. A preferred extrusion temperature for the polypropylene is about 480° F. when the filaments 10 are extruded at a linear rate of from about 18 to about 30 feet per minute from the orifices 30 which range from about 8 mils to about 500 mils in diameter. The term mils as used herein denotes a linear measurement of one-thousandth of an inch. The extruded filaments 10 are guided into the quench bath 12, containing a liquid non-solvent for isotactic polypropylene, e.g., water, by a guide roll 11. The bath 12 is maintained in a suitable tank 13 at a temperature of at least as low as about 60° F., the lower temperature limit for bath 12 being determined by the brittleness of unoriented isotactic polypropylene at low temperatures as well as practical cost considerations. Thus, a practical lower temperature limit for bath 12 is about 40° F. Above the given upper temperature limit for bath 12, filaments with substantial "curl" are produced and later processing difficulties such as the formation of nubs in filaments 10 may occur. The term, "nub" describes a condition in the filaments wherein, at spaced intervals, the filament is enlarged. The preferred operating temperature for bath 12 is about 55° F. An immersion time of from about 8 seconds to about 20 seconds of the filaments 10 in the quench bath 12 is required to produce straight or nub-free non-curling filaments. Accordingly, the path of travel in bath 12 is varied in length as the linear rate of extrusion is varied, and vice versa, to provide adequate immersion time in the bath 12 in the foregoing range.

The extruded filaments 10 are transported around a stationary pin 14 in the quench bath 12 and out of the bath 12 thence over roll 15 and into a hot air conditioning oven 18. Continuing over driven rolls 16 as shown, the filaments 10 follow a zig-zag path in the oven 18 as heated air is circulated from overhead as indicated by arrows 19. Each succeeding driven roll 16 over which a filament 10 passes is driven at a slightly increased peripheral speed from that of the preceding roll by any suitable means. This slight increase in peripheral speed provides sufficient tension on the filaments 10 to prevent sagging as they pass through the oven 18 and may impart some stretch on the filaments 10 of a total of about 25% over six or more driven rolls. It is not essential, however, to impart any stretch in the filaments as they pass over the rolls 16 and only sufficient tension therein to prevent sag is necessary. The primary purpose of the driven rolls 16, or a similar system, is to provide a heat exchange relationship between the filaments 10 and heated air or other fluid medium in the oven whereby the filaments are uniformly softened by heat. The crystalline isotactic polypropylene employed for the purposes of this invention has a softening temperature in the range of from about 260° F. to about 305° F. or slightly higher, but below the crystalline melting point of the polymer. If the temperature employed in the oven is below the lower given limit for the softening temperature, stretching without nub formation in the filaments is difficult to achieve. It has been found that if the oven is maintained at a temperature near the given upper limit of the softening temperature of the polymer, i.e., from about 300° F. to about 305° F., a superior end product results in which the filaments so conditioned and produced, exhibit little or no fibrillation characteristics. It is sometimes desired, however, that the filaments 10 exhibit fibrillation characteristics particularly for use as bristles, in which case, the temperature in the oven 18 should be maintained at from about 260° F. to about 280° F. The filaments 10 become heat softened after being subjected to hot gas in the oven 18 for about from 1 to 2 minutes and attain the same temperature as the air entering the oven 18.

The filaments 10 after leaving the last and uppermost driven roll 16, are snubbed with a three roll assembly 17, each roll of which is driven at about the same as or a higher peripheral speed than that of the last driven roll 16. A fast roll 20 is provided just outside the oven 18, and, between the assembly 17 and the fast roll 20, the filaments 10 are stretched from about 6 to about 11 times or more of their length. The peripheral speed of fast roll 20 is about 6 to about 11 times that of the assembly rolls 17. Filaments which are suitable as bristles when cut or staplized into various lengths are produced by employing a stretch of about 6 and a half times the original length, i.e., a stretch ratio of about 6.5 to 1, is sufficient and preferred. For continuous cordage filaments of from 500 to 600 denier, a stretch ratio of at least 10 or 11 to 1 is preferred to produce filaments with tensile strengths in excess of 6 grams/denier and a dry or wet elongation at breaking of 15% or less.

A high degree of molecular orientation is effected in hot melt extruded isotactic polypropylene filaments which are heat stretched in accordance with this invention as is evidenced by characteristic X-ray diffraction patterns of such filaments. However, if the filaments are merely collected after heat stretching, a tendency of the filaments to curl again is observed. The magnitude of the curl in the filaments leaving the fast roll 20 is not as great as that experienced when the cold quenching step performed in the bath 12 is omitted. However, the degree of curl produced even when the bath 12 is employed, is sufficient to be objectionable and constitutes a problem. This problem is solved by employing a second quenching step which is illustrated in FIGURE 1. Thus, the oriented filaments 10 are guided around a dip roll 21 in a second quench bath 22 contained in a tank 23. The requirements for this second quenching are essentially the same as those employed in quenching the freshly extruded filaments, i.e., just after filament extrusion. However, it is possible to use lower quenching temperatures in this second quenching step because isotactic polypropylene filaments oriented in accordance with this invention are not brittle at temperatures as low as −65° F. Thus, the second quenching suitably is carried out by immersing the stretch oriented filaments in a liquid non-solvent bath for the filaments at a temperature of at least as low as about 60° F., preferably from about 35° F. to 55° F. The optimum temperature for the second quench bath 22 is about 55° F. The duration of the immersion in the second quenching bath is, preferably, from about one to about 12 seconds depending upon the cross-sectional diameter of the oriented filament which is approximately as many times less as the same diameter of the extruded filament prior to stretching, as the square root of the stretch ratio. In any event, the exact minimum immersion time necessary in the second quench bath for an oriented filament of any particular mean cross-sectional diameter in order to produce straight, non-curling filaments, can be determined by a simple experimentation.

The oriented filaments 10 are drawn from the bath 22 by a driven snubbing system such as a pair of snubbing rolls 24 and collected on a reel 25 supported on a frame 26. The snubbing rolls 24 cooperate with the snubbing assembly 17 to control stretching between the assembly 17 and the fast roll 20.

Referring to FIGURE 2, there is shown an enlarged view of the extrusion head 8, the general reference numeral in FIGURE 1, showing the orifices 30 in an orifice bar 31 held to a hollow body 32 by the bolted clamps 33, the hollow body 32 being suspended in the bracket members 34. The electrical resistance heating elements 35 supply heat to the extrusion head. The orifices 30 may be of any cross-sectional shape, but for the production of bristles are preferably round. The orifices 30 may be countersunk on the side of bar 31 which is inside the body 32, or conically tapered so that the orifices 30 become smaller in diameter toward the point of extrusion. Such countersinking or tapering of the orifices 30 is done to reduce the resistance to the flow of molten polypropylene therethrough. The structure in FIGURE 2 is typical of what may be employed to extrude the filaments or bristles of this invention.

It is apparent from the above description of the method of this invention that the essential features thereof are melt extruding filaments and other shaped articles of crystalline isotactic polypropylene, first quenching the freshly extruded filaments and then quenching the filaments a second time after they have been stretched in a heat softened condition as described. Both quenching steps preferably are carried out by immersing the filaments in a bath of a liquid non-solvent for the filaments. The first such quench bath is maintained at a temperature of from about 40° F. to about 60° F., and the second bath is maintained at a temperature of at least as low as about 60° F.

A magnified view (300×) of an end of a bristle made by applying a shearing force transversely of the longitudinal axis of an oriented filament 10 produced in accordance with this invention is shown in FIGURE 3. The shearing force must be sufficient to sever the filament and is applied preferably, along a line or path perpendicular to a longitudinal axis of the filament. The shearing force is preferably applied to a bundle or two containing at least two or three hundred filaments. The sheared-off end 36 is rounded and has a pointed lip or barb 37 extending laterally, substantially perpendicularly to the longitudinal axis of the oriented filament 10. This rounded end is extremely resistant to abrasion. Consequently, bristles so cut from the filaments of this invention are useful in brushes particularly for street cleaning, removal of rust from metal as well as in other types of brushes designed to provide a harsh abrasive property. If bristles having a lip or barb 37 are subjected to wear and the length of the bristle decreased thereby, the lip 37 is not destroyed, but instead continues to exist as the bristle wears in use. This unique property is enhanced by employing oriented fibers prepared according to this invention so as to exhibit a high degree of fibrillation.

The bristles, prepared according to this invention also have unique return characteristics as compared with other synthetic bristles when arcuately flexed or bent and then released at one point along the arc while being held at another point. The bristle, or a given length of a filament returns, upon release, to substantially its original straight unflexed position as will nylon bristles, but the rate of return is considerably slower than that of a conventional oriented 6-6 nylon bristle having the same dimensions. This property is especially important in broom, dust brush and paint brush bristles. Thus, this property of these bristles prevents "flicking" of dirt or paint when the brush is used in its intended environment. These bristles, moreover, provide a brush in which the bristles do not become permanently set in a curled position after a short time in use. Filaments of this invention from about 5 mils to about 200 mils in mean diameter and cut into bristles varying in length from about ¼ of an inch to 15 inches or more have the return characteristic described. Filaments made in accordance with this invention of from about 5 mils to about 100 mils in mean diameter are preferred for making bristles.

In the broad sense, the process of this invention may be applied to extruded shaped articles other than filaments which are free of curl and air bubbles. In particular, shaped articles may be produced by the process that have at least one dimension which is relatively large with respect to at least one other dimension, for example, melt extruded ribbons and films. Such articles may be heat stretched along more than one of their large dimensions, i.e., laterally with respect to the direction of extrusion in addition to longitudinally. Thus, this invention may be employed to prepare very thin exceptionally tough tapes which have a variety of uses, including that of a flexible base for electrically responsive coatings used in the recording field.

The starting material for this invention is a high molecular weight, solid, crystalline, substantially isotactic polymer of propylene having a crystalline melting point as determined by birefringence, of at least about 329° F., preferably about 333° F. and a specific gravity of about 0.90 to 0.91. A preferred isotactic polypropylene for the purpose of this invention has a melt index of from about 28 grams/ten minutes to about 30 grams/ten minutes under a load of 10 kilograms at a temperature of 250° C., the melt index being determined substantially in accordance with ASTM D1238–52T employing the load and temperature herein specified and measuring the weight of polymer extruded by the ASTM procedure over a period of ten minutes. Solid, high molecular weight isotactic polypropylene may be prepared in accordance with procedures taught by G. Natta in the Journal of Polymer Science, vol. XVI, pp. 143–154 (1955). A more recent review on methods of making the polymer is in an article by G. Bier in Kunststoffe, Bd. 48, pp. 354–362 (August 1958). The disclosures of these two articles are hereby incorporated by reference into and made a part of this disclosure.

The following working examples illustrate the invention and constitute the best mode contemplated of carrying out the invention representing preferred embodiments thereof.

*Example 1*

Pellets of crystalline isotactic polypropylene having a crystalline melting point of 333° F., specific gravity of 0.90 and a melt index of 28 grams/ten minutes under a 10 kilogram load at a temperature of 250° C., were preheated in a hopper to 180° F. feeding a 2" Hartig extruder. The temperature of screw barrel at the feed end was 400° F. and increased to 480° F. at the outlet end which was connected to a heated extrusion head fitted with an 11 inch extrusion bar having 15 vertically disposed orifices 78.5 mils in diameter. The temperature across the outer head wall opposite the connection to the Hartig extruder, was observed to be 470° F. although the melted polymer therein was probably at a temperature near 480° F. The Hartig extruder was operated to extrude filaments uniformly from the orifices at a linear rate of 19 feet/minute. The so extruded filaments were guided into an aqueous quench bath at a temperature of 55° F. The length of travel for each filament between the point of extrusion and the surface quench bath was two inches and that in the quench bath 64 inches. From the quench bath, the filaments were directed into the bottom of an oven in which hot air was circulated from top to bottom at a rate of 3100 cubic feet/minute so that the oven had air temperatures of 260° F., 280° F. and 300° F. in the lower, middle and upper regions respectively thereof. In the oven, the filaments followed a zig-zag path over a series of rolls driven at gradually increasing peripheral speeds to prevent sagging of the filaments and thereby impart tension such that a 25% increase in filament length occurred. The filaments traveled generally upward as well as back and forth as shown in FIGURE 1 of the accompanying drawing for a time interval of 1½ minutes. At the top of the oven, the filaments passed through a three-roll snubbing system to prevent stretching prior to that point and control stretching between the snubbing rolls and a fast roll just outside the oven. The filaments were stretched six and half times their length to give oriented filaments 30 mils in diameter. After stretching, the oriented filaments were quenched a second time by immersion in an aqueous bath at 55° F. for two seconds, drawn between two snubbing rolls driven at the same peripheral speed as the fast roll, and collected on a reel. These filaments were straight and exhibited no tendency to curl. X-ray diffraction by the filaments gave characteristic sharp pattern lines indicating a high degree of orientation of the polymer crystallite structure.

*Example 2*

A bundle of 150 of the filaments made in Example 1 were cut into bristles 2½ inches in length by a guillotine type cutter. Microscopic examination (300×) of the cut ends of these bristles revealed that each bristle had a rounded end with a pointed lip or barb extending perpendicularly to a longitudinal axis of the bristle as shown in FIGURE 3. Several bristles selected at random were flexed or bent in a 180° arc by grasping the bristles near each end and bending. One end was then released and each bristle made a substantially complete return to its original straight alignment after spring-like oscillations near complete return. Comparisons with oriented 6-6 nylon bristles of the same size demonstrated that the bristles of this invention had a slower return than nylon bristles under the same flexing conditions, but were not permanently set or distorted by such flexing.

*Example 3*

A number of the bristles in Example 2 were assembled and set as bristles in a general utility hand brush. This brush was successfully used to remove scale from a piece of badly rusted steel. The same brush also was employed along with a strong detergent solution in scrubbing a ceramic tile floor.

*Example 4*

Filaments were made of the same batch of isotactic polypropylene and in the same manner as in Example 1 except that the air temperature of the top of the oven and that of the filaments when stretched was 280° F. Straight, non-curling filaments resulted which exhibited fibrillation specially when broken under tension while the filaments of Example 1 when similarly broken did not fibrillate. The tensile strengths of the filaments of this example and those of Example 1 were both in excess of 100,000 pounds per square inch.

*Example 5*

Example 1 was repeated except that an extrusion bar with 30 orifices 24 mils in diameter was used. Filaments 6 mils in diameter were produced. These filaments were straight and non-curling like those in Example 1. Two inch bristles cut from the filaments had complete return characteristics when arcuately flexed and released.

*Example 6*

Example 1 again was repeated with the 30 orifices, 24 mil orifice diameter extrusion bar. The filaments were stretched 10 to 1 at 305° F. and otherwise processed as set forth in Example 1. The filaments so prepared were 560 denier and had a tensile trength of 6.87 grams/denier with a dry elongation at breaking of 12.2%. In view of these properties, the filaments made outstanding stranded cordage of from ⅛ inch to ½ inch in diameter.

*Example 7*

Crystalline isotactic polypropylene having a crystalline melting point of 333° F., a specific gravity of 0.90 and a melt index of 28 grams/10 minutes under a load of 10 kilograms at a temperature of 250° C., was extruded through a thin slot, 1/16 inch x 1½ inches, at 480° F. This ribbon-like extrusion was quenched in an aqueous bath at 45° F. and stretched two and a half times its length at a temperature of 280° F. A strong, tough webbing material having a thickness of about 40 mils was thereby made. It was found to be useful for banding wooden crates containing heavy articles such as refrigerators.

It is to be understood that the foregoing description and examples are illustrative only and do not limit the spirit and scope of my invention as defined in the appended claims.

*Comparison Example*

Filaments were made of the same batch of isotactic polypropylene as used in Example 1 and under the same conditions except that both the quench bath after extrusion and the second quench bath which follows stretching, were maintained at a temperature of 175° F. The filaments produced were quite curly and could not be straightened by mechanical bending. X-ray diffraction of these filaments gave the same patterns as, but less defined than those of the filaments of Example 1, indicating a lower degree of orientation of the polymer crystallite structure.

I claim:

1. A method of making an oriented filamentary article of isotactic polypropylene which comprises melt extruding a filament of said polymer, immediately immersing and quenching said extruded filament in a bath of a non-solvent liquid for said polymer at a temperature of from about 40° F. to at least as low as about 60° F., then heating said quenched filament to a temperature within its softening range and longitudinally stretching said heat-softened filament.

2. A method according to claim 1 wherein the temperature of the bath is about 40° F.

3. A method of making an oriented filamentary article of isotactic polypropylene which comprises melt extruding a filament of said polymer, immediately immersing and quenching said extruded filament in a bath of a non-solvent liquid for said polymer at a temperature of from about 40° F. to at least as low as 60° F., then heating said quenched filament in a fluid medium for a time sufficient to heat said filament to a temperature of from about 260° F. to about 305° F., and longitudinally stretching said heat-softened filament.

4. A method according to claim 3 wherein the temperature of the bath is about 40° F.

5. A method according to claim 3 wherein the longitudinally stretched, heat-softened filament is again cooled after said stretching and then collected.

6. A method according to claim 5 wherein the longitudinally stretched, heat-softened filament is again cooled by immersing and quenching said stretched filament in a second bath of a non-solvent liquid for said filament at a temperature of from about 35° F. to about 60° F.

7. A method of making an oriented ribbon-shaped article of isotactic polypropylene which comprises melt extruding a ribbon of said polymer, immediately immersing and quenching said extruded ribbon in a bath of a non-solvent liquid for said polymer at a temperature of from about 40° F. to at least as low as 60° F., then heating said quenched ribbon in a fluid medium for a time sufficient to heat said ribbon to a temperature of from about 260° F. to about 305° F., and longitudinally stretching said heat-softened ribbon.

References Cited in the file of this patent

UNITED STATES PATENTS

| | | |
|---|---|---|
| 2,210,771 | Myles et al. | Aug. 6, 1940 |
| 2,219,700 | Perrin et al. | Oct. 29, 1940 |
| 2,285,552 | Alfthan | June 9, 1942 |
| 2,335,515 | Jehle | Nov. 30, 1943 |
| 2,344,511 | Harder | Mar. 21, 1944 |
| 2,367,173 | Martin | Jan. 9, 1945 |
| 2,389,655 | Wende | Nov. 27, 1945 |
| 2,445,726 | Willert | July 20, 1948 |
| 2,612,679 | Ladisch | Oct. 7, 1952 |
| 2,674,025 | Ladisch | Apr. 6, 1954 |
| 2,728,950 | Annesser | Jan. 3, 1956 |
| 2,825,721 | Hogan et al. | Mar. 4, 1958 |
| 2,887,155 | Keefe | May 19, 1959 |
| 2,895,171 | Holmes-Walker et al. | July 21, 1959 |
| 2,936,492 | Swerlick et al. | May 17, 1960 |
| 2,947,598 | Maragliano et al. | Aug. 2, 1960 |
| 2,961,711 | Diedrich et al. | Nov. 29, 1960 |
| 3,008,185 | Goldman | Nov. 14, 1961 |

FOREIGN PATENTS

| | | |
|---|---|---|
| 217,642 | Australia | Oct. 14, 1958 |
| 108,284 | Pakistan | Oct. 3, 1958 |